United States Patent
Lu et al.

(10) Patent No.: US 8,903,618 B2
(45) Date of Patent: Dec. 2, 2014

(54) METHOD AND DEVICE FOR PROVIDING BRAKING ASSISTANCE IN A MOTOR VEHICLE AFTER AN INITIAL COLLISION

(75) Inventors: Jianbo Lu, Livonia, MI (US); Roland Schaefer, Haan (DE); Peter W. A. Zegelaar, Heerlen (NL); Gilberto Burgio, Aachen (DE); Monika Derflinger, Aachen (DE); Otto Hofmann, Erftstadt (DE)

(73) Assignee: Ford Global Technologies, Dearborn, MI (US)

( * ) Notice: Subject to any disclaimer, the term of this patent is extended or adjusted under 35 U.S.C. 154(b) by 520 days.

(21) Appl. No.: 13/174,205

(22) Filed: Jun. 30, 2011

(65) Prior Publication Data

US 2012/0004819 A1 Jan. 5, 2012

(30) Foreign Application Priority Data

Jun. 30, 2010 (DE) .......................... 10 2010 017 659

(51) Int. Cl.
| | |
|---|---|
| *B60T 8/17* | (2006.01) |
| *B60T 7/22* | (2006.01) |
| *B60T 8/32* | (2006.01) |
| *B60W 10/18* | (2012.01) |
| *B60W 30/08* | (2012.01) |

(52) U.S. Cl.
CPC ................. *B60T 7/22* (2013.01); *B60T 8/3275* (2013.01); *B60T 2201/022* (2013.01); *B60T 2201/024* (2013.01); *B60T 2201/03* (2013.01); *B60W 10/18* (2013.01); *B60W 2030/082* (2013.01)
USPC .................. 701/70; 701/78; 701/83; 701/301

(58) Field of Classification Search
CPC .... B60Q 1/44; B60R 21/013; B60R 21/0136; B60T 2201/024; B60T 7/22; B60T 8/17554; B60T 8/17558; B60T 2201/12
USPC ............... 701/70, 76, 78, 82, 83, 91, 92, 301; 180/274, 275
See application file for complete search history.

(56) References Cited

U.S. PATENT DOCUMENTS

| | | | | |
|---|---|---|---|---|
| 2002/0112912 | A1* | 8/2002 | Napier et al. | 180/275 |
| 2005/0133317 | A1* | 6/2005 | Chen et al. | 188/193 |
| 2009/0150034 | A1* | 6/2009 | Ezoe et al. | 701/53 |
| 2010/0292887 | A1* | 11/2010 | Becker et al. | 701/29 |
| 2012/0083983 | A1* | 4/2012 | Danz et al. | 701/70 |

* cited by examiner

*Primary Examiner* — Jerrah Edwards
(74) *Attorney, Agent, or Firm* — Angela M. Brunetti; Raymond Coppiellie

(57) ABSTRACT

A method and system for providing braking assistance in a motor vehicle after an initial collision involves detecting an initial collision, pre-charging a brake system, detecting an intent to brake on the part of a driver, and providing assistance to a braking process by means of a braking assistance system on the basis of the detection of the initial collision and the detection of intent to brake on the part of the driver.

24 Claims, 2 Drawing Sheets

US 8,903,618 B2

METHOD AND DEVICE FOR PROVIDING BRAKING ASSISTANCE IN A MOTOR VEHICLE AFTER AN INITIAL COLLISION

CROSS REFERENCE

The inventive subject matter is a continuation of foreign filed application DE 102010017659.1, filed Jun. 30, 2010, whose subject matter is incorporated herein by reference and provides the basis for a claim of priority of invention under 35 U.S.C. §119.

TECHNICAL FIELD

The invention relates to a method for providing braking assistance in a motor vehicle and more particularly to providing braking assistance after an initial collision.

BACKGROUND

Modern safety equipment in motor vehicles, such as Collision Mitigation Systems (CMS) or Collision Avoidance Driver Support Systems (CADS), attempt to prevent vehicle impact by avoiding collisions. In the event an impact still occurs, or if a vehicle is hit by another vehicle, there are, apart from passive safety devices, no further safety measures available for avoiding or mitigating the severity of an accident that may be the result of a secondary collision.

When a vehicle, also known as a target vehicle, has been hit, it experiences an initial impact and continues to move. In such an event, the target vehicle may become a projectile vehicle and potentially be involved in a secondary collision. Safety measures such as CMS or CADS may be activated. However, the systems may not function satisfactorily, due to the initial impact. Such unstable movement may prevent normal functioning of the collision mitigation systems.

For vehicle-to-vehicle impact, the drivers of the vehicles involved should apply the brake. However, the drivers, having just been involved in a collision, may not be capable of making a suitable braking request because, for example, the driver could apply the brake in a panicked fashion, the driver could be distracted, or the braking request may not have normal requirements.

There is a need to improve the safety of drivers and motor vehicles after an initial collision.

SUMMARY

According to a first embodiment of the inventive subject matter, a method for providing braking assistance in a motor vehicle after an initial collision involves detecting an initial collision, pre-charging a brake system, detecting an intent to brake on the part of a driver, and providing assistance to a braking process by means of a braking assistance system on the basis of the detection of the initial collision and the detection of intent to brake on the part of the driver.

According to another embodiment of the inventive subject matter, a computer program, or algorithm as part of a computer program, carries out the method described above on a computer. This computer can be a control computer or some other computer or controller of the motor vehicle. The computer program can be stored in a memory, in particular in a non-volatile memory. This permits rapid and repeated use of the program, for example after each new start of the motor vehicle.

In yet another embodiment of the inventive subject matter, a device for braking assistance in a motor vehicle after an initial collision has a controller with a braking assistance algorithm. The controller has a signal input for an initial collision signal, a signal input for a braking intention signal, which indicates an intention to brake on the part of the driver, and a signal output for a braking control signal for assisting the braking process with the braking assistance algorithm on the basis of the detection of the intention to brake on the part of the driver and the initial collision. This device can efficiently and reliably carry out the method described above.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter.

Figure 1:
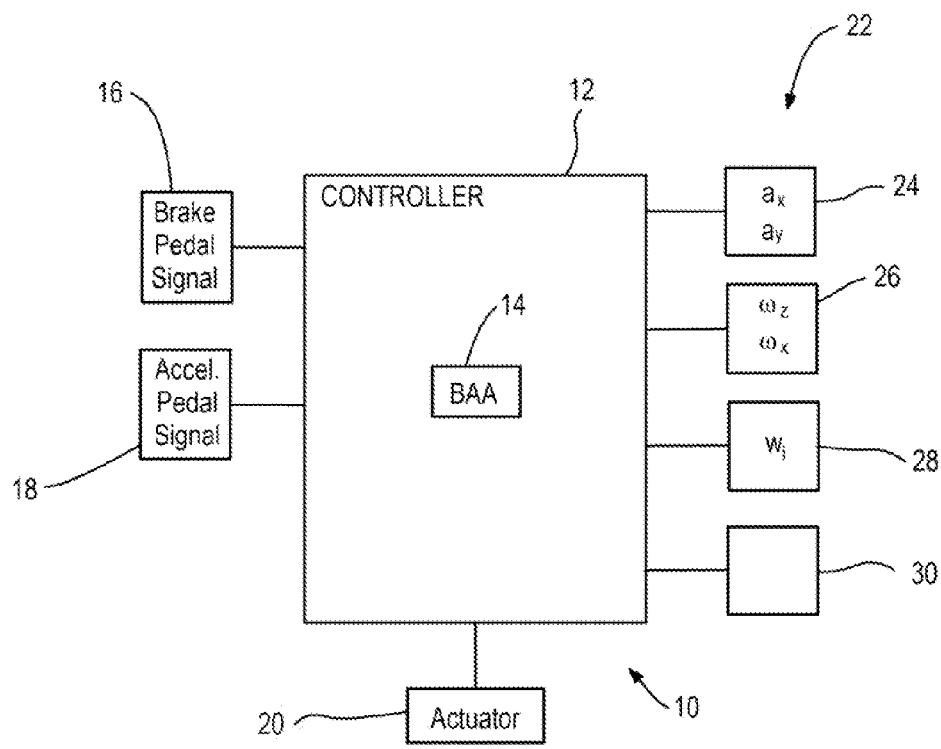
FIG. 1 is a block diagram of a device for providing braking assistance in a motor vehicle after an initial collision.

FIG. 1 is a block diagram of a braking assistance system 10 for a motor vehicle which assists the driver of the motor vehicle during a braking process, in particular, after an initial collision. The system 10 has a controller 12 having a braking assistance algorithm 14 stored, for example in a non-volatile memory of the controller 12.

The controller 12 is connected to a brake pedal value signal generator 16 and to an accelerator pedal value signal generator 18, which, for example, measure the force or speed of a pedal movement by the driver and output a corresponding measured value to the controller 12. An actuator 20 of the brake system, such as for example, a hydraulic pump or an active brake booster, is correspondingly actuated by the controller 12 in order to prepare or initiate a braking process.

Furthermore, the controller 12 is connected to a sensor system 22 for detecting collisions. The sensor system 22 comprises acceleration sensors 24 for sensing a longitudinal acceleration and a lateral acceleration, movement sensors 26 for sensing a yaw rate and rolling rate, and speed sensors 28 for sensing wheel speeds. The sensors 24, 26, 28 supply signals to the controller 12 which are used to detect an initial collision on the basis of the signals with the braking assistance control algorithm 14. Further inputs for the detection of an initial collision can be various flags such as the triggering of an airbag or an interruption in a fuel supply. The controller 12 may also be connected to further drive assistance systems in order to obtain the most complete possible picture of the situation in which the motor vehicle is located. For example, the sensor system 22 may include ambient sensors such as a vision sensor, camera, radar, lidar and the like that are used by the controller 12 to determine a path of travel, or route determination, for the motor vehicle after a collision has occurred.

The device for providing braking assistance can have a sensor system for sensing the initial collision, wherein the sensor system generates the initial collision signal. If the sensor system is associated with the device for providing braking assistance, this can have the advantage of a permanently defined and complete system, which is beneficial, for example, for the production and maintenance of software of in the case of possible retrofits.

The sensor system can have a speed sensor, a yaw rate sensor, an acceleration sensor, an air pressure sensor, an image processing sensor, and/or a sound sensor. The sensor system can therefore be adaptively tailored to safety requirements on the one hand and to the costs and vehicle complexity on the other hand. The sensor system 22 may also include environmental or ambient sensors 30 such as pressure, audio, video, radar, lidar and the like.

Figure 2:
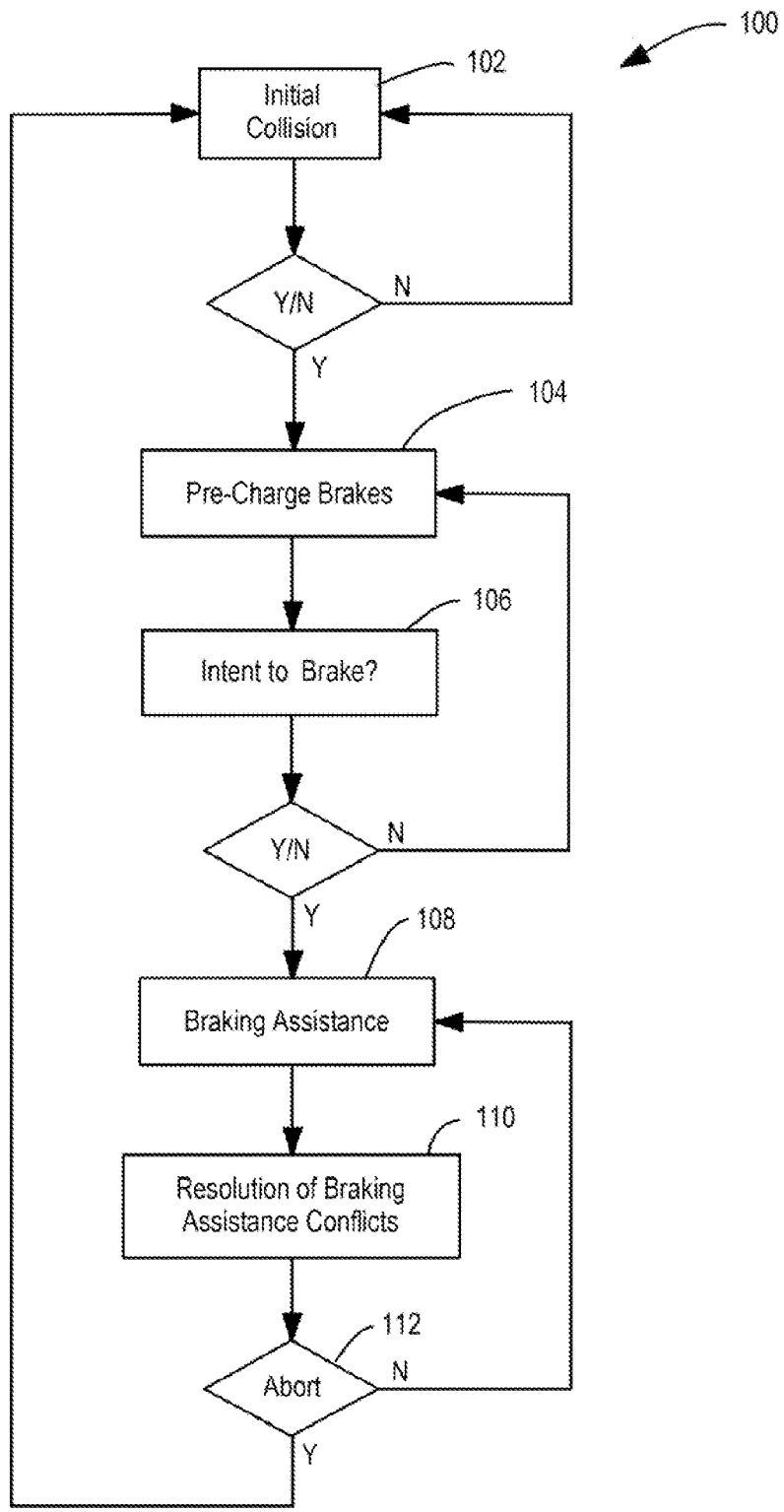
FIG. 2 is a flowchart of a method for providing braking assistance in a motor vehicle after an initial collision.

FIG. 2 is a flow chart of a method of the inventive subject matter. In normal driving mode the controller 12 continuously samples sensor signals and evaluates them. A decision is made as to whether or not an initial collision is present 102. An initial collision may be detected by the activation of an airbag, by the switching off of the fuel supply and/or measured values from at least one or two movement sensors which lie outside a normal range. This type of detection has the advantage that sensors which are already present and which monitor a broad spectrum of the motor vehicle may be used. It is therefore possible for a rather precise image of the situation to be obtained and correspondingly reacted to.

The following abbreviations and designations are used:

longitudinal acceleration: $a_x$ lateral acceleration: $a_y$ yaw rate: $\omega_z$ rolling rate: $\omega_x$ wheel speeds: $w_i$ vehicle reference speed: $v_x$ flag indicating the impact phase: InImpact flag in the uncontrollable impact: InUncontrollableImpact flag indicating the post-impact phase: PostImpact deactivation-override flag: DeactivationOverride Typically the fuel supply is interrupted if the longitudinal speed and/or lateral speed drops below or exceeds a specific threshold. Interruption of the fuel supply may be used as a factor in detecting an initial collision 102. For example,

```
if Fuel_Cutoff Flag ==1
    PostImpact_fc=1;
else
    PostImpact_fc=0;
```

It is also possible to use a modified fuel supply with an attenuated threshold value as a trigger for the braking assistance algorithm.

```
if Modified Fuel_Cutoff Flag ==1
    PostImpact_mfc=1;
else
    PostImpact_mfc=0;
```

A further trigger for the detection of an initial collision 102 is triggering signals of an airbag.

```
if Any Air_Bag_Deployment_Flag ==1
    PostImpact_ab=1;
else
    PostImpact_ab=0;
```

It is also possible to use modified signals which raise or lower the sensitivity of the braking assistance algorithm to trigger detection of an initial collision 102.

```
if Any Modified_Air_Bag_Deployment_Threshold is exceeded
    PostImpact_mab=1;
else
    PostImpact_mab=0;
```

Sensor values of an electronic stability control (ESC) system can be used as a further trigger for the detection of an initial collision 102.

Even assuming a sensor error, an initial collision can be detected 102 with the ESC movement sensors. The following variables are used:

$a_y[z_1]$, $a_y[z_2]$, $a_y[z_3]$: the last three values of the longitudinal acceleration $\omega_z[z_1]$, $\omega_z[z_2]$, $\omega_z[z_3]$: the last three values of the yaw rate $w_2[z_1]$, $w_3[z_1]$ passed-on-values of the real wheel speeds DelayTimer SetDelayTimer LrgAyGradCounter LrgWzGradCounter PISCActivationTimer: PISC duration In an initialization, the sensor signals, the calculated variables and the flags which are specified in the region of the input variables are received and a global counter is started:

```
if(PISCDisable= = 1)
    DelayTimer = 0;
elseif(DelayTimer < 1000)
    DelayTimer=DelayTimer + 1;
else
    DelayTimer = 1000;
and set
    LrgAyGradCounter=0;
    LrgWzGradCounter=0;
    SetDelayTimer=0;
    InImpact = 0;
    PostImpact=0;
    DeactivationOverride=0;
```

For the purpose of preparing the longitudinal acceleration, the gradients of the longitudinal accelerations are calculated with the last four sampled values;

$$da_y=a_y-a_y[z_1]$$

$$da_y[z_1]=a_y[z_1]-a_y[z_2]$$

$$da_y[z_2]=a_y[z_2]-a_y[z_3]$$

and the average gradient of the longitudinal acceleration during the last four sample values.

$$d_4a_y=a_y-a_y[z_3]$$

It should be noted that the delta value is calculated over a sampling time of 10 ms, $d_4a_y$ is averaged over four sampled values, that is to say over 40 ms. For the purpose of preparing the yaw rate, the gradients of the yaw rates are calculated with the last four sampled values;

$d\omega_z = \omega_z - \omega_z[z_1]$ $d\omega_z[z_1] = \omega_z[z_1] - \omega_z[z_2]$ $d\omega_z[z_2] = \omega_z[z_2] - \omega_z[z_3]$ and the average gradient of the yaw rated during the last four sampled values.

$d_4\omega_z = \omega_z - \omega_z[z_3]$

It should be noted that the delta value is calculated over a sampling time of 10 ms, $d_4\omega_z$ is averaged over four sampled values, that is to say over 40 ms.

For the purpose of preparing the anticipated yaw rate, the yaw rate which is based on the wheel speeds is calculated using the sensor signals for the speeds of the two rear wheels:

$\omega_{wssr} = (w_2 + w_2[z_1] - w_3 - w_3[z_1])/2/t_r$ where $t_2$ is the travel of the rear axle.

The gradient of the lateral acceleration is monitored as follows. If the individual gradients and the average gradients of the lateral acceleration simultaneously meet the following condition:

$|da_y| > a, |da_y[z_1]| > a, |da_y[z_2]| > a, |d_4a_y| > a_{av}$ then, the following logic carries out:

```
LrgAyGradCounter=LrgAyGradCounter+1;
if (SetDelayTimer==0)
{
    DelayTimer=0;
    SetDelayTimer=1;
}
``` where $a, a_{av}$ are the threshold values.

The gradient of the yaw rate is monitored as follows. If the individual gradients of the yaw rates simultaneously meet the following condition:

$|d\omega_z| > w, |d\omega_z[z_1]| > w, |d\omega_z[z_2]| > w, |d_4\omega_z| > w_{av}$ then set:

LrgWzGradCounter=LrgWzGradCounter+1:

where $w, w_{av}$ are the threshold values.

For detection of the impact, it is first determined whether an impact occurs 102. This can be done by checking whether the time delay between the high yaw rate gradient and the high lateral acceleration gradient is below a limiting value. This may be implemented with the following logic. If the following conditions are met:

LrgWzGradCounter>0&&LrgAyGradCounter>0&&DelayTimer<$T_1$ then set the in-impact flag as:

InImpact=1 where $T_1$ is the permitted time period between the gradients of the lateral acceleration and the yaw rate.

Then for detection of the state after the impact, if the target vehicle is in the impact state, the yaw rate and other signals continue to be monitored in order to identify a movement in the state after the impact phase. The impact phase and the phase after the impact are differentiated because Post Light Impact Stability Control (PLISC) is to be active during the large unstable movement of the motor vehicle. Therefore, further monitoring of the motor vehicle after the impact provides a further robustness test for the PLISC activation. With the current logic, a level of the yaw rate above yawrate_bound (for example, 60 degrees/second) after an in-impact mode has been identified is used in order to activate an unstable movement in the state of the impact phase.

```
if (InImpact ==1)
    if(ω_z > yawrate_bound || (ω_z < -yawrate_bound)
    {
        PostImpact_esc =1;
        InImpact = 0;
        LrgWzGradCounter=0;
        LrgAyGradCounter=0;
        DelayTimer=0;
    }
```

For detection of an uncontrollable impact, if the conditions for the gradient of the lateral acceleration $|da_y| > a_u, |da_y[z_1]| > a_u, |da_y[z_2]| > a_u, |d_4a_y| > a_{ayu}$ are met with limiting values higher than those during the detection of the impact, and subsequently a saturated lateral acceleration is found to occur, the impact is considered to be an uncontrollable impact, that is to say the following is set:

InUncontrollableImpact=1:

where are the limiting values.

If during the in-impact mode and the post-impact mode the motor vehicle experiences a rolling rate which is greater than normal (for example, greater than 60 degrees/second), the impact is then considered to be an uncontrollable impact and the following is set:

InUncontrollableImpact=1:

If during the in-impact mode and the post-impact mode an airbag is activated, the impact is then considered to be an uncontrollable impact and the following is set:

InUncontrollableImpact=1:

The concluding flag for the detection of the impact is determined among the above detections:

PostImpact=max(PostImpact$_{esc}$,PostImpact$_{mfc}$, PostImpact$_{fc}$,PostImpact$_{mab}$,PostImpact$_{ab}$)

A conflict solution between the received data items may take place. In this way it is possible to prevent a situation in which, owing to a malfunction of a sensor, possibly due to the initial collision, part of the braking assistance system, or the entirety of the system, is deactivated. Furthermore, safety system can be provided with a priority, for example, an impact based braking assistance system may be assigned a higher priority or trustworthiness than a braking assistance system which is based on an image processing sensor.

The solution is provided for handling conflict between sensor fail-safety and the triggering of the impact state. The sensor fail-safety logic used in brake controllers such as Anti-lock Brake System (ABS), Traction Control System (TCS), Electronic Stability Control (ESC), etc. can register a flag for a sensor impact and can then possibly switch off all the brake control functions during certain motor-vehicle-to-motor-vehicle accidents. For this reason, a conflict solution is carried out between the triggering of the impact state and the flag regarding the invalidity of the sensor to the effect that the invalidity of the sensor is overridden by the triggering of the impact state.

```
if any SensorInvalid==1
{
    Checking_PostImpact_Flag;
    if PostImpact==1
    {
```

-continued

```
            SensorInvalid=0;
            Terminate_Sensor_Failsafe_Logic_In_ESC;
        }
        else
        {
            SensorInvalid=1;
            AllowBrakeControlTerminatation=1;
        }
    }
    else
    {
        all SensorInvalid=0;
        AllowBrakeControlTerminatation=0;
    }
```

Furthermore, a conflict solution is carried out between a fixed brake pressure command and a brake pressure command that is based on a slip ratio. If the wheel speeds are outside of a normal range of the ABS operation, the brake control which is based on a slip ratio is replaced by a brake control which is not based on a slip ratio, that is to say the system does not change into the ABS mode. Instead, a fixed amount of brake pressure $P_{pibamax}$ is transmitted to all the wheels, which fixed amount of brake pressure is near to the maximum of the efficiency of the brake pressure.

If no initial collision occurs after the conditions and the conflict solutions, the algorithm branches back to the block 102. In the event of an initial collision, the algorithm branches to block 104. In block 104, the brake system is pre-charged. For this purpose, after the detection of the impact, detected by the flag, PostImpact, a small amount of brake pressure, $P_{precharge}$ is generated in order to be sent to the brake calipers in order to prevent possible hydraulic delays. Likewise, the sensitivity of the brake assistance system can be increased in order to assist more rapid triggering of the brakes.

Pre-charging the brake system after the initial collision is detected significantly reduces the risk of a secondary collision. The method of the present invention is easily incorporated with safety measures of an impact as a target vehicle if the target vehicle becomes a projectile vehicle. Such a transformation may occur when the target vehicle rotates after an initial collision and a collision mitigation system, which is present and may be based on an image processing sensor, does not function completely. Subsequently, a post-impact braking assistant according to the inventive subject matter assumes the function of performing safety measures. The intention to brake can be detected by upward movement of the accelerator pedal and the possible preparation for braking.

The brake system can be pre-charged by requesting a small amount of braking force and/or by lowering the triggering threshold of the brake system. The request for a small amount of braking force causes the brake calipers to be moved into the vicinity of the brake disks in order, on the one hand, to permit more rapid access and, on the other hand, to avoid possible hydraulic delays. The lowering of the triggering threshold contributes to making the brake respond more quickly in order to avoid a follow-on collision.

In block 106 an intention to brake on the part of the driver is detected. For this purpose, after the registration of the impact, it is detected whether the driver reacts to the incident by taking his foot off the accelerator pedal and possibly preparing for a braking process. Referring now to FIG. 1, the controller 12 receives signals regarding the positions and/or the movements of the brake and accelerator pedals from the brake pedal value signal generator 16 and the accelerator pedal value signal generator 18.

Referring back to FIG. 2, if it becomes apparent that the driver does not intend to brake, the algorithm branches back to block 104. When an intent to brake is detected, the algorithm branches to block 108 to assist the braking process with the braking assistance system 10 on the basis of the detection of the intention to brake on the part of the driver 106 and the detection of the initial collision 102.

In block 110, resolution of conflicts between braking assistance functions are performed. For example, control signals which are output by a braking assistance system which is based on image processing sensors are overridden by the described braking assistance system 10 which is based on the detection of the initial collision 102. This is advantageous because the brake system which is described herein is more reliable in the state after an impact.

The provision of assistance to the brake system may be ended after an abort criterion has been met. It is possible that the provision of assistance to the brake system is activated only for a specific emergency time period, then returns to normal operating mode or another state. The abort criterion can, for example, be stabilization of the motor vehicle in which the normal safety systems are again functionally capable, or a specific time period such as, for example, 2.5 seconds, or a stationary state of the vehicle, or if the driver activates the accelerator pedal the first time or releases the brake.

In block 112, it is decided whether the provision of assistance to the brake system is ended after an abort criterion has been met. If this is the case, the algorithm branches back to block 102 and normal operation. If no abort criterion is present, the algorithm branches back to block 108.

The abort criterion can, for example, be stabilization of the motor vehicle in which the normal safety systems are again functionally capable, or a specific time period such as, for example, 2.5 seconds. Other examples are a stationary state of the motor vehicle, if the driver activates the accelerator pedal for the first time, or releases the brake.

If the driver stops braking, but a number of other measured values, such as a high yaw rate or a high speed of a wheel are outside the normal values, the braking assistance system continues to assist the braking process until these values are in the normal range.

If the driver activates the brake, but a number of other measured values such as a high yaw rate or a high speed of one or more wheels are outside the normal values, the braking assistance system does not permit the braking process.

If the driver deactivates the brake too early, the braking assistance system continues to brake until, for example, a time period of 2.5 seconds has expired after the setting of the flag for the initial collision.

Measured values from ambient sensors can be processed in order to carry out route planning of the motor vehicle. Within the scope of route planning it is possible to provide the braking assistance in a more targeted fashion under certain circumstances. Ambient sensors, which are environmental sensors, such as a vision sensor (i.e., camera, radar, lidar, etc.), are able to provide information that allows determination of a future path which the vehicle may take. Using the path information, it may be possible to determine a manner in which to brake the vehicle such that the vehicle is steered in a direction that will deter or prevent secondary collisions. For example, using route determination will allow the method to brake the vehicle such that it will avoid being steered into oncoming traffic.

Figure 3:
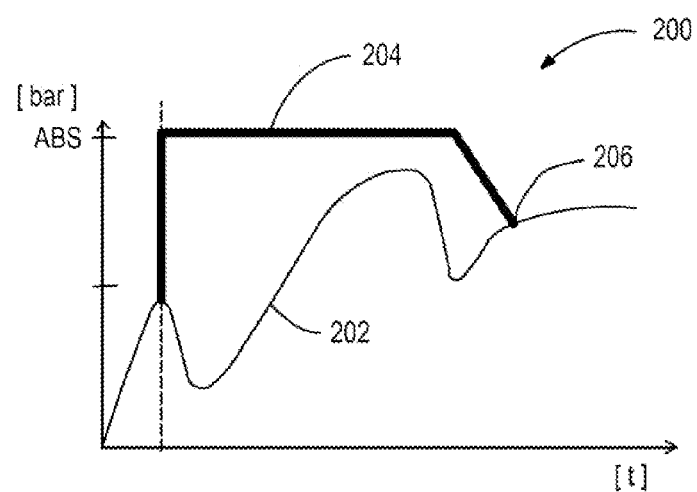
FIG. 3 is a graph of a brake pressure profile vs. time.

FIG. 3 is a graph 200 of the braking force as requested by the driver 202 and the brake pressure of the braking assistance system brought about by the impact 204 plotted against time.

If the conditions for an impact and an intention to brake on the part of die driver are met, the braking assistance system increases the brake pressure up to the ABS pressure. This maximum pressure is maintained until one of the abort criteria applies, such as for example the driver taking his foot off the brake pedal. The brake pressure from the braking assistance system is then slowly reduced as shown in the negative gradient of the plot 204, until the brake pressure again corresponds to the pressure requested by the driver at point 206 on the plot. While the brake assistance system is activated, it assists the driver with the maximum brake pressure, independently of the level of the requested brake pressure.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method for providing braking assistance in a motor vehicle after an initial collision, the method comprising the steps of:
    detecting an initial collision;
    pre-charging a brake system upon detection of the initial collision;
    detecting an intent to brake on the part of a driver; and
    applying braking assistance to the brake system upon detection of the initial collision and detection of the intent to brake.

2. The method as claimed in claim 1 further comprising the step of overriding control signals to the brake system from a source other than the braking assistance applied upon detection of the initial collision and detection of the intent to brake.

3. The method as claimed in claim 1 wherein the step of applying braking assistance to the brake system further comprises the steps of:
    detecting at least one abort criteria;
    ending the application of braking assistance upon meeting the at least one abort criteria.

4. The method as claimed in claim 3 wherein the step of detecting at least one abort criteria includes detecting an abort criteria from the group consisting of: a signal indicating stabilization of the motor vehicle, a predetermined time period, a signal indicating a stationary state of the vehicle, a signal indicating activation of the accelerator pedal, and a signal indicating a release of the brake.

5. The method as claimed in claim 4 wherein the step of detecting at least one abort criteria comprises detecting a signal indicating release of the brake, the method further comprises the steps of:
    monitoring a yaw rate;
    monitoring at least one wheel speed; and
    continuing to apply braking assistance until the yaw rate or the at least one wheel speed is within a predetermined range.

6. The method as claimed in claim 1 further comprising the steps of:
    monitoring a yaw rate;
    monitoring at least one wheel speed;
    preventing the application of braking assistance when a yaw rate or a wheel speed are outside of a predetermined range.

7. The method as claimed in claim 1 wherein the step of detecting an initial collision further comprises detecting at least activation of an airbag, switching off of a fuel supply, or detecting measured values from at least one vehicle sensor, the measured value being outside of a predetermined range.

8. The method as claimed in claim 1 wherein the step of pre-charging a brake system further comprises the steps of:
    requesting a small amount of braking force from the braking system; and
    lowering a triggering threshold of the brake system.

9. The method as claimed in claim 1 further comprising the steps of:
    measuring values from ambient sensors on the motor vehicle;
    processing, the measured values to determine a post-collision path of the motor vehicle; and
    applying braking assistance wherein the post-collision path of the motor vehicle is modified through the application of braking assistance.

10. A system for providing braking assistance to a brake system in a motor vehicle after an initial collision comprising:
    a controller having a braking assistance algorithm;
    a signal representative of a detection of the initial collision input to the controller;
    a signal representative of a detection of an intent to brake on the part of a driver; and
    a control signal provided from the braking assistance algorithm to the brake system for assisting a braking process on the basis of the detection of the signal representative of the initial collision and a signal representative of the intent to brake.

11. The system as claimed in claim 10 further comprising a sensor system for detecting the initial collision and generating the signal representative of the detection of the initial collision.

12. The system as claimed in claim 11 wherein the sensor system further comprises:
- a yaw rate sensor;
- at least one wheel speed sensor; and
- at least one acceleration sensor.

13. The system as claimed in claim 12 wherein at least one acceleration sensor further comprises:
- a lateral acceleration sensor; and
- a longitudinal acceleration sensor.

14. The system as claimed in claim 12 wherein the sensor system further comprises a roll rate sensor.

15. The system as claimed in claim 12 wherein the sensor system further comprises an air pressure sensor.

16. The system as claimed in claim 12 wherein the sensor system further comprises an image processing sensor.

17. The system as claimed in claim 12 wherein the sensor system further comprises a sound sensor.

18. The system as claimed in claim 10, wherein the braking assistance algorithm further comprises
- receiving a signal indicative of an initial collision in the controller;
- receiving a signal indicative of an intent to brake on the part of a driver its the controller; and
- outputting a signal for applying braking assistance to the brake system upon detection of the initial collision and detection of the intent to brake.

19. The system as claimed in claim 18, wherein the braking assistance algorithm further comprises generating a signal to pre-charge the brake system upon receipt of the signal indicative of the initial collision.

20. The system as claimed in claim 18, wherein the braking assistance algorithm further comprises resolving conflicts between the braking assistance signal and any brake signals from other vehicle systems that are associated with the brake system.

21. The system as claimed in claim 18, wherein the braking assistance algorithm further comprises:
- receiving a signal indicative of confirmation of an abort criterion being met; and
- outputting a signal for ending the application of braking assistance upon receiving confirmation of the abort criterion.

22. The system as claimed in claim 21 wherein the step of receiving a signal indicative of confirmation of an abort criterion being met further comprises receiving a signal indicative of one or more events from the group consisting of: stabilization of the motor vehicle, a predetermined time period, a stationary state of the vehicle, activation of the accelerator pedal and a release of the brake.

23. The system as claimed in claim 18 wherein the step of receiving a signal indicative of an initial collision further comprises a signal indicative of activation of an airbag, switching off of a fuel supply, or measured values from one or more vehicle motion sensors that are outside of a predetermined range.

24. The system as claimed in claim 18, wherein the braking assistance algorithm further comprises the steps of
- receiving at least one signal indicative of a vehicle environment from one or more ambient sensors on the motor vehicle;
- processing the at least on signal to determine a post-collision path of the motor vehicle; and
- outputting a signal for applying braking assistance such that the post-collision path of the motor vehicle is modified.

* * * * *